UNITED STATES PATENT OFFICE 2,441,249

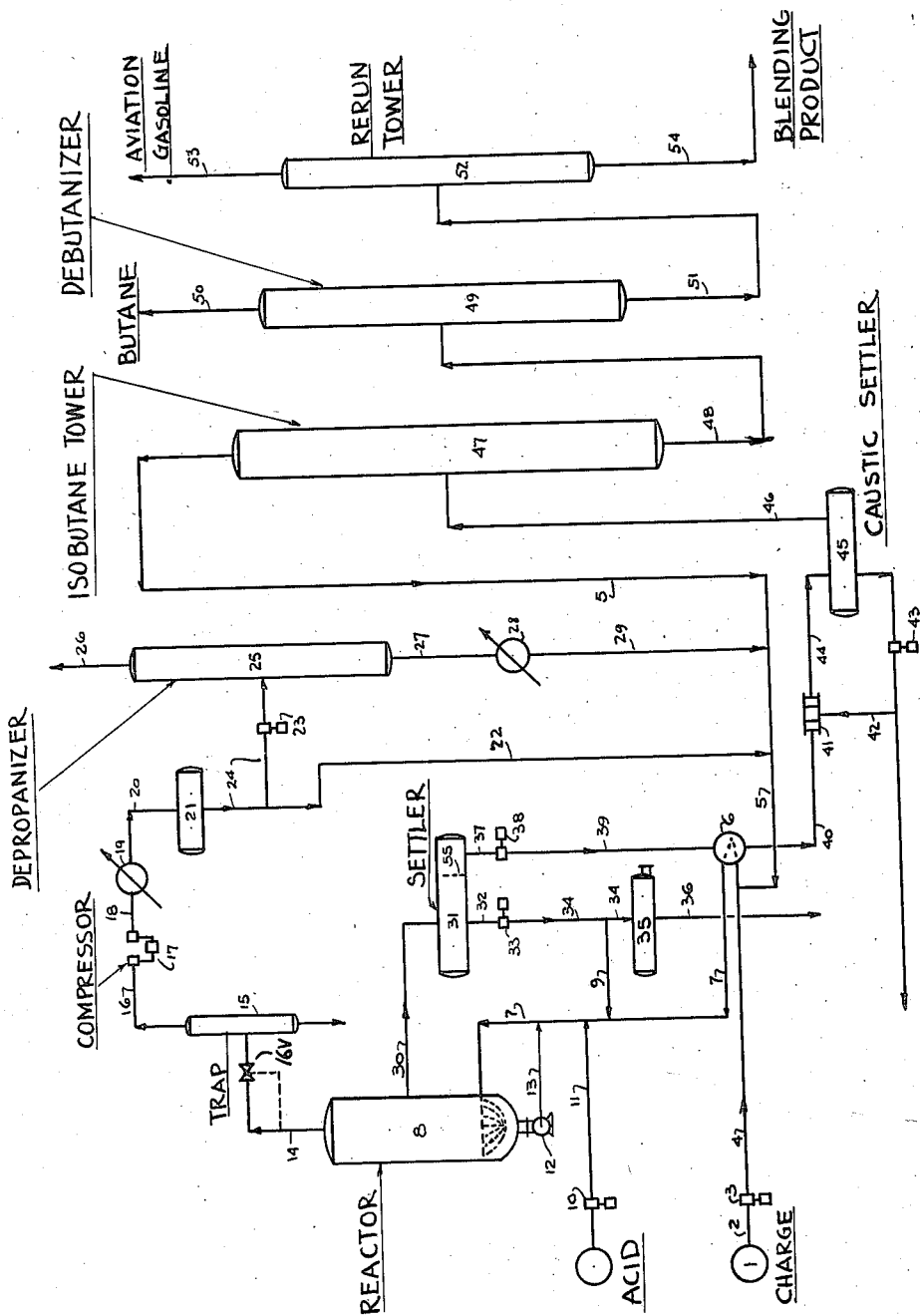

CATALYTIC ALKYLATION PROCESS FOR THE MANUFACTURE OF HIGH ANTI-KNOCK GASOLINE

Cecilio L. Ocon and Ernest A. Ocon, Yonkers, N. Y.; said Cecilio L. Ocon assignor to said Ernest A. Ocon Application June 27, 1940, Serial No. 342,812

5 Claims. (Cl. 260—683.4)

This invention relates to a process for the manufacture of high anti-knock gasoline by the alkylation of isoparaffins, such as isobutane, with olefine hydrocarbons such as propene, butene and pentene, in the presence of a suitable acidic catalyst such as concentrated sulfuric acid.

Among the objects of the present invention is to provide a method for the economical processing of normally gaseous olefines and isoparaffins to give high yields of normally liquid hydrocarbons boiling in the gasoline range, said liquid hydrocarbons being superior-quality blending agents for aviation gasoline. This object, among others, will become apparent as the invention is described.

The hydrocarbon materials for subjection to treatment in this invention are commonly available in petroleum refineries from various sources, such as a cracking still stabilizer overhead. These refinery hydrocarbon fractions, which are most suitable for treatment, contain the following hydrocarbons: propane, butenes, isobutane, normal butane, pentene, isopentane and normal pentane. However, limited amounts of propene may be reacted successfully under substantially the same conditions.

In order to make the invention more fully understood, reference will now be made to the accompanying drawing, which is a diagrammatic illustration of one form of apparatus employed for suitable operation of this invention.

Hydrocarbons of suitable composition, such as described above, are drawn from a suitable refinery source 1, through line 2, and pumped by pump 3 through line 4, wherein they may be joined, if desired, by hydrocarbon recycle streams passed through line 5. This mixture is cooled in exchanger 6 and passed through line 7 to reactor 8 jointly with acid recycle carried in line 9, fresh acid pumped by pump 10 through line 11, and a reactor recirculating hydrocarbon-acid emulsion pumped by pump 12 through line 13. The mixed acid and hydrocarbons are violently agitated by suitable means (not shown) in the reactor, at temperatures in the range of 20° F. to 70° F., and at subatmospheric, atmospheric or superatmospheric pressures, the pressures employed being commensurate with the temperature and composition of the reactor contents. To a large degree the agitation is effected by ebullition, but this may be supplemented by mechanical means (not shown).

The temperature of the reactor 8 is maintained at the desired level by means of allowing a portion of the reactor hydrocarbons to vaporize from the reactor 8 and pass as vapor through line 14 to a liquid trap 15, where entrained liquid and some condensate separate leaving the vapors to flow through line 16 to compressor 17, where the vapors are compressed and flow through line 18 to cooler 19, where the vapors are cooled and condensed. The liquid from the cooler 19 passes through line 20 to accumulator drum 21. A portion of the compressor condensate liquid is pumped by pump 23 through line 24 to depropanizer tower 25. The propane concentration in the reaction zone is controlled through the feed stock composition, the rate of charge, and the rate of recycling used for eliminating the excess propane, which is withdrawn in the overhead product tail gas from the depropanizer through line 26. The hydrocarbon depropanizer bottoms having a restricted or negligible content of propane flow through line 27, water cooler 28 and line 29, to join with line 5 and flow back to the reactor.

In the preferred mode of operation for obtaining optimum temperature control and optimum alkylate yield, the catalyst concentration and dilution of reactants are controlled within specific limits so as to prevent the formation of undesired by-products such as polymers, neutral esters, and oxidized products. With the alkylation reaction temperature kept within the optimum range of +20° F. to +70° F., the sulfuric acid strength is preferably maintained in the range of about 88% to 100%, while the volatile diluent concentration of hydrocarbons, such as propane and butane, as well as the concentrations of the olefine and isoparaffin reactants, are maintained within appropriate limits using the type of system described. Various metal salts, such as salts of silver, copper, vanadium and mercury, preferably their sulphates, or similar salts of strong mineral acids, may be added as promoters. It has been found that boron fluoride can also be used as a promoter for alkylation and also for increasing yields.

Accordingly, the desired efficient temperature control and a highly-efficient mixing of the materials in the alkylation zone are obtained by maintaining therein controlled concentrations of highly volatile non-reactive hydrocarbons, which undergo vaporization in the reactor under suitable pressures.

More specifically, it is very advantageous to have present in the reaction mixture being subjected to alkylation a small concentration of propane in the range of about 1% to 10% by volume of the total hydrocarbons, and preferably as near to 1% as possible, with the pressure in the reactor being from 5 to 50 pounds per square inch, gage, and preferably from 5 to 25 pounds per square inch, gage. With the propane present in such amounts under these pressures, not only is the reaction mixture temperature more readily regulated but the alkylation progresses satisfactorily with a minimum formation of undesired byproducts.

Part of this increased efficiency is apparently due to the mixing effect of the boiling propane, isobutane and normal butane, for this boiling may occur in all parts of the reaction mixture to prevent stratification and thereby giving added agitation to the mechanical devices used for such purposes. Moreover, the internal cooling is more sensitive to sudden temperature increases than cooling by heat exchange, and permits uniform control with automatic temperature devices.

Thus, the pressure release valve 16v in vapor line 14 may be thermostatically controlled, and likewise the compressor 17, to maintain automatically the necessary pressure in the reactor for keeping the alkylation temperature completely under control. For example, if the temperature in the reactor begins to rise, the valve 16v and the compressor 17 are adjusted to decrease the pressure and lower the temperature in the reactor through increased vaporization caused therein.

It will be apparent that not any small amounts of any unreacted propene, ethane, and ethylene which may be present in the reaction mixture will tend to vaporize with the propane, as well as butanes. However, the vaporized hydrocarbons having no more than three carbon atoms other than propane are ordinarily present in negligible amounts of less than 1% by volume; and the vaporized butanes flowing with propane vapors from the reactor reach substantial proportions when the temperature of the reaction approaches the higher limit of the range or if the propane concentration becomes very low and the pressure becomes greatly decreased in the reactor. An additional advantage gained from the use of propane in the manner described is in maintaining higher concentrations of isobutane for the reactor.

The portion of the compressor condensate liquid, which by-passes the depropanizer, flows through line 22 to join with line 5 for return to the reactor with the fresh charge and other recycle streams.

The net liquid hydrocarbon reactor effluents with sulfuric acid catalyst pass from the reactor 8 through line 30 to the acid settler drum 31, wherein the hydrocarbons are separated from the acid catalyst. The sulfuric acid catalyst which separates, flows through line 32 to pump 33, where the large portion of the acid is pumped through lines 34 and 9 as acid recycle back to line 7 and then returned to the reactor. A quantity of used sulfuric acid catalyst is withdrawn through line 34 to the final acid settler 35, where any entrained or dissolved hydrocarbons are removed by heating the acid. This used or spent acid flows through line 36 to acid sludge storage or to an acid recovery unit for revivification (not shown).

The hydrocarbons from the acid settler 31 flow over the baffle plate 55 through line 37 to pump 38, which pumps the hydrocarbons which contain the high anti-knock gasoline as well as the lighter hydrocarbons such as propane, isobutane, normal butane, isopentane, etc., through line 39 to the exchanger 6 wherein these cooler hydrocarbons serve to reduce the temperature of the hydrocarbons which leave the exchanger in line 7. The hydrocarbons from the acid settler flow from the exchanger 6 through line 40 to caustic-wash mixing nozzles 41, where they are thoroughly contacted with suitable-strength caustic solution being circulated through line 42 by pump 43. The combined caustic and hydrocarbon emulsion flows from the mixing nozzles 41 through line 44 to caustic settler 45, where the hydrocarbons, freed of any acid gases or acid by neutralization, are separated from the caustic solution.

The hydrocarbons flow from the caustic settler drum 45 through line 46 to the isobutane fractionator 47, where the highly-concentrated isobutane fraction, which is taken as net overhead, is recycled through line 5 to line 4 and back to the reaction system with the other streams described above. The bottoms materials from the isobutane fractionator 47, which contains the bulk of the normal butanes and the reaction products, pass from the isobutane fractionator bottom through line 48 to the debutanizer fractionator 49, where substantially all of the normal butanes are removed overhead as a net product through line 50. The bottoms material from the debutanizer flow through line 51 to rerun fractionator 52, where the reaction product or alkylate is fractionated into an aviation fraction which is removed overhead as a product through line 53; and a heavier boiling fraction, which is suitable for blending with motor fuel, is removed as a bottoms product through line 54.

It is, of course, obvious that all references to fractionator tower appurtenances such as reflux condensers, pumps, reboilers, valves, etc., have been purposely omitted from this description, but the scope of this invention includes all such items and instruments necessary for the proper operation of all apparatus, even though these items are not specifically shown in the drawing, or mentioned in the description.

As an illustration of the operation of this invention a hydrocarbon stock of the following constituents is selected as indicative of a suitable charge material. (In the following table the term "bbls." is understood to consist of 42 U. S. gallons each.)

|  | Lbs./Hr. | Bbls./Day |
| --- | --- | --- |
| Propane | 178 | 23 |
| Isobutane | 3,190 | 388 |
| Butene | 2,860 | 335 |
| N-Butane | 4,650 | 545 |
|  | 10,878 | 1,291 |

The above liquefied charge is subjected to treatment with sulfuric acid catalyst of 96% strength at a temperature of 40° F. Highly concentrated isobutane liquid is added to the reaction mixture in sufficient amounts to bring the ratio of isobutane to olefines in the reactor to 4 to 1 or higher. The reaction products together with unreacted hydrocarbons are separated from acid catalyst and the hydrocarbons washed with caustic solution to remove any traces of acid gases or entrained sulfuric acid. The neutralized hydrocarbons are then fractionated into a fraction consisting of normally liquid high anti-knock hydrocarbons boiling in the gasoline range; a highly concentrated isobutane liquid fraction which is returned to the reactor as recycle; a highly concentrated normal butane as a liquid product for blending, and a propane-rich fuel gas product. The fraction which consists of the high anti-knock normally liquid hydrocarbons may be further fractionated into an aviation gasoline-blending fraction and a heavier motor fuel fraction. The products derived from the charge stock tabulated above are as follows:

|  | Lbs./Hr. | Bbls./Day |
|---|---|---|
| Propane-rich fuel gas: | | |
| Propane | 178 | 23 |
| Isobutane | 58 | 7 |
| | 236 | 30 |
| Butane product: | | |
| Isobutane | 174 | 21 |
| N-butane | 4,650 | 545 |
| | 4,824 | 566 |
| Aviation product | 4,958 | 485 |
| Heavy motor fuel product | 860 | 75 |

The foregoing illustration is only one method of operation. Although designed most advantageously for a continuous operation, the present process may also be adapted for an improved batch operation. It is evident that many modifications and variations of this invention may be made without departing from the scope of the invention.

It is to be understood that instruments for measuring and controlling temperatures, pressures, and flow velocities, and also that pumps, compressors for impelling the flow of fluids through conduits, and other control apparatus not shown or indicated, are to be used for the operation described when required and in a manner as well known in the art.

It is also to be understood that this invention is not to be limited by theoretical considerations or specific illustrative examples used for purposes of illustration, but it is desired to claim all the invention in the broadest scope in the following claims.

Having described our invention, what we claim and desire to secure by Letters Patent is as follows:

1. A continuous alkylation process for the production of normally liquid hydrocarbons of high anti-knock quality boiling in the gasoline range, which comprises subjecting under pressure in a reaction zone normally gaseous hydrocarbons in a liquid phase comprised chiefly of isoparaffins and olefines to the action of strong sulfuric acid catalyst and boron fluoride in the presence of a controlled liquid propane concentration restricted to from 1.0 to 10.0% by volume of the hydrocarbons in said reaction zone.

2. A continuous process for the manufacture of high anti-knock gasoline, which comprises subjecting under pressure in a reaction zone normally gaseous hydrocarbons in a liquid phase comprised chiefly of isobutane, normal butane and butenes in the presence of a controlled liquid propane concentration restricted to from 1.0 to 10.0% by volume of the hydrocarbons, to the action of strong sulfuric acid catalyst and boron fluoride in said reaction zone, wherein the isobutane is alkylated by the butenes to produce normally liquid hydrocarbons of high octane number boiling in the gasoline range.

3. In a process for producing gasoline motor fuel from normally gaseous hydrocarbons, the step of reacting isobutane with a normally gaseous olefin of at least three carbon atoms per molecule in the presence of a catalyst consisting predominantly of a mixture of sulphuric acid and boron fluoride.

4. In a process for producing motor fuel from a hydrocarbon mixture containing an olefin and an isoparaffin by treatment with sulfuric acid under alkylating conditions, the improvement which comprises effecting said treatment in the presence of boron fluoride.

5. A continuous process for the manufacture of high anti-knock gasoline, which comprises subjecting under pressure a normally gaseous hydrocarbon stream containing isoparaffins and olefines to the catalytic action of a catalyst comprising concentrated sulfuric acid and boron fluoride in an alkylation reaction zone to produce normally liquid hydrocarbons boiling in the gasoline range, withdrawing from the alkylation reaction zone a hydrocarbon-catalyst emulsion, recycling back to the said alkylation reaction zone said hydrocarbon-catalyst emulsion, separating overhead from the emulsion of said hydrocarbons and catalyst in said alkylation reaction zone vaporized hydrocarbons including a portion of the propane present in said reaction zone, collecting, compressing, cooling and condensing the vaporized hydrocarbons, passing a portion of the condensed hydrocarbons to a fractionating zone for removal of propane in excess of that required to maintain a propane concentration of less than 10.0% by volume in said alkylation reaction zone, separately withdrawing from said reaction zone liquid hydrocarbons containing reaction products and catalyst, passing said liquid hydrocarbons to a separation zone wherein the said catalyst is separated from the hydrocarbons, fractionally distilling the liquid hydrocarbons containing reaction products to obtain a fraction rich in isobutane, mixing said fraction rich in isobutane with the portion of the condensed hydrocarbons from which excess propane has been removed and with the remaining portion of the condensed hydrocarbons from which propane has not been removed, and passing the said mixture to said alkylation reaction zone.

CECILIO L. OCON.
ERNEST A. OCON.

REFERENCES CITED

The following references are of record in the file of this patent:

UNITED STATES PATENTS

| Number | Name | Date |
|---|---|---|
| 1,955,873 | Deanesly | Apr. 24, 1934 |
| 2,172,560 | Kemp et al. | Sept. 12, 1939 |
| 2,201,823 | Bradley | May 21, 1940 |
| 2,211,747 | Goldsby et al. | Aug. 13, 1940 |
| 2,232,674 | Pyzel | Feb. 18, 1941 |
| 2,233,144 | Pinkerton et al. | Feb. 25, 1941 |
| 2,238,802 | Altshuleret al. | Apr. 15, 1941 |